United States Patent [19]

Urata et al.

[11] Patent Number: 4,789,906
[45] Date of Patent: Dec. 6, 1988

[54] VIDEO SIGNAL RECORDING APPARATUS

[75] Inventors: Kaoru Urata; Sentaro Tsuji, both of Kanagawa, Japan

[73] Assignee: Sony Corporation, Tokyo, Japan

[21] Appl. No.: 75,897

[22] Filed: Jul. 21, 1987

[30] Foreign Application Priority Data

Aug. 2, 1986 [JP] Japan ................ 61-182346

[51] Int. Cl.$^4$ .................................... H04N 5/78
[52] U.S. Cl. ................................ 360/33.1; 358/340
[58] Field of Search ............... 360/33.1; 358/310, 315, 358/335, 340

[56] References Cited

U.S. PATENT DOCUMENTS 4,597,021 6/1986 Yamamitsu et al. .............. 360/33.1

Primary Examiner—Eugene R. LaRoche
Assistant Examiner—David Mis
Attorney, Agent, or Firm—Lewis H. Eslinger

[57] ABSTRACT

An apparatus for processing a video signal to be recorded having a pre-emphasis circuit for pre-emphasizing a signal component with a first predetermined frequency band in the video signal to produce a pre-emphasized video signal, a modulating circuit for frequency modulating a carrier with the pre-emphasized video signal to be recorded, an extracting circuit for extracting a signal component with a second frequency band within the first predetermined frequency band and having a level higher than a threshold level from the video signal, a multiplier for multiplying the outputs of the modulating circuit and the extracting circuit, whereby the amplitude of the frequency modulated signal from the modulating circuit at the portion when the extracted signal is obtained is higher than at the rest of the portion, and a recording amplifier for amplifying the output of the multiplier. Accordingly, the level of the frequency modulated video signal is changed in response to the level of the extracted output signal in the second frequency band, thereby to minimize the deteriorations of frequency characteristic and waveform characteristic of the video signal and to avoid the occurrence of an inversion phenomenon.

10 Claims, 6 Drawing Sheets

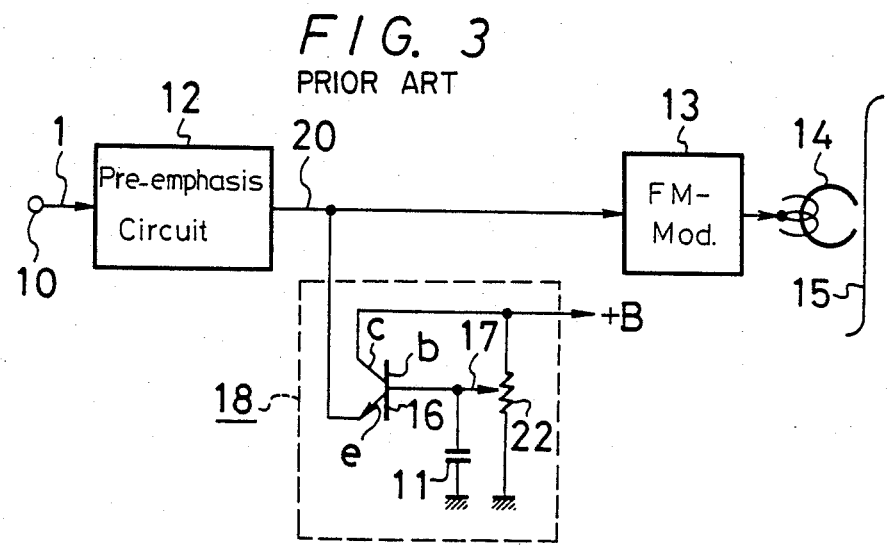
FIG. 3 PRIOR ART
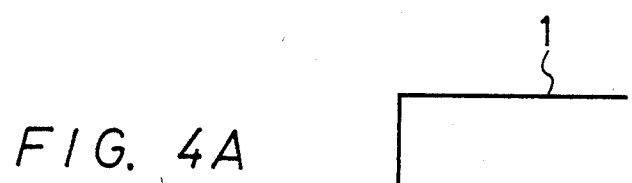
FIG. 4A
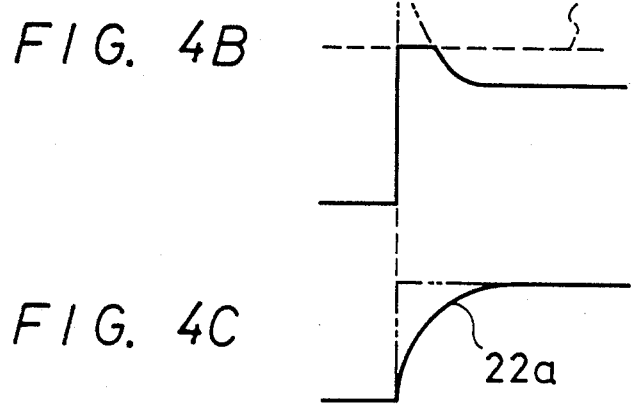
FIG. 4B
FIG. 4C

VIDEO SIGNAL RECORDING APPARATUS

BACKGROUND OF THE INVENTION

1. Field of the Invention

The present invention relates generally to apparatus for processing a video signal to be recorded suitable for use with a video tape recorder. More particularly, this invention relates to an apparatus for processing a video signal to be recorded, by which a so-called level inversion phenomenon can be avoided.

2. Description of the Prior Art

Conventionally, in a video tape recorder (VTR), in order to improve an S/N (signal-to-noise) ratio, a signal component with a high frequency band in a video signal is pre-emphasized and the pre-emphasized video signal is frequency modulated and recorded at the recording side whereas the pre-emphasized video signal is de-emphasized and returned to the original video signal at the reproducing side. If the signal level of the high frequency component of the pre-emphasized video signal is increased too much, an undesired influence such as an over-modulation and the like will be exerted upon the video signal upon FM-modulation. Therefore, at the recording side of the VTR, in order that the level of the signal component of the video signal does not exceed a threshold level, the above video signal is clipped and then frequency modulated.

If a video signal 1 shown, for example, in FIG. 1A is passed through a pre-emphasis circuit (not shown), the high frequency component of the video signal 1 is differentiated to produce a sharp overshoot portion 4 and a sharp undershoot portion 5 at a leading edge portion 2 to the white level and at a trailing edge portion 3 to the dark level as shown in FIG. 1B, reference numerals 19 and 21 designate predetermined dark and white clipped levels, respectively.

If the pre-emphasized video signal is supplied, as it is, to an FM-modulator circuit of the next stage and the FM-modulated video signal is recorded on and reproduced from a magnetic tape, the FM-modulated video signal is in a so-called over-modulated condition so that in extreme cases, a so-called level inversion phenomenon will occur.

The reason that this level inversion phenomenon, for example, white peak level inversion phenomenon occurs in this example, will be described with reference to FIGS. 2A to 2C.

As illustrated in FIG. 2A, an FM-modulated video signal 1a rises up abruptly from the dark level of the original video signal to its white level at a leading edge portion 2. Thus, as shown in FIG. 2B, a magnetized pattern 7 at the portion 2 where the frequency is changed from low to high becomes such that a magnetized pattern b is cancelled out by a magnetized pattern a. That is, a reproduced waveform 8 of the video signal becomes such that, as shown in FIG. 2C, an amplitude 9 of the reproduced waveform 8 at which the magnetized pattern a is changed to the magnetized pattern b is reduced and the reproduced waveform 8 does not cross the zero level. As a result, an FM demodulator circuit at the reproducing side of the VTR determines that the frequency of the video signal at this point is considerably low, so that the luminance signal becomes the dark level.

Such inversion phenomenon also occurs in the dark level peak portion due to the following reason.

That is, if the video signal is pre-emphasized, after the pre-emphasized video signal is FM-modulated, the frequency of, for example, 3.6 MHz to 4.8 MHz is expanded to the frequency of about 2 MHz to 6.5 MHz and then there is produced a ternary higher harmonic wave. Then, a phase relationship between the primary and ternary higher harmonic waves causes an abnormal zero cross so that the FM-demodulating circuit judges the dark level to be a white level.

Without such level inversion phenomenon, the S/N ratio of the video signal is deteriorated at the top portion of the overshoot portion 4 or the undershoot portion 5.

To remove the defect as described hereinabove, it is proposed in the prior art to provide a clipper or level slice circuit between the pre-emphasis circuit and the FM-modulator circuit to clip the overshoot portion 4 or the undershoot portion 5 at a level higher than a certain threshold level.

This previously-proposed method will be described with reference to FIG. 3. FIG. 3 illustrates an example of a known video signal recording apparatus.

Referring to FIG. 3, a video signal 1 is supplied to a video input terminal 10 and then is fed through a pre-emphasis circuit 12 and pre-emphasized therein. The pre-emphasized video signal therefrom is supplied to an FM-modulator circuit 13, in which it is frequency modulated. The FM video signal is supplied to a magnetic head 14 by which the FM video signal is recorded on a magnetic tape 15. A clipper or level slice circuit 18 is provided between the pre-emphasis circuit 12 and the FM-modulator circuit 13. The level slice circuit 18 uses, for example, an NPN transistor 16. In the level slice circuit 18, a signal line 20 for a video signal from the pre-emphasis circuit 12 is connected to an emitter e of the NPN transistor 16 of which the collector c is directly coupled to a reference voltage source +B of 12V. Further, the base b of the NPN transistor 16 is connected to an adjusting sliding contact 17 of a potentiometer 22 to perform a so-called white clipping operation in which the white level side of the video signal is clipped. A capacitor 11 is connected between the sliding contact 17 of the potentiometer 22 and the ground and each clip level is adjusted by the potentiometer 22 connected to the reference voltage source +B.

The known VTR in which the level slice circuit 18 using the NPN transistor 16 is provided in the recording system circuit as described above cannot overcome the following defect. That is, the signal component clipped by the level slice circuit 18 is dropped from the reproduced video signal returned to the original condition by the de-emphasis circuit at the reproducing side so that the reproducibility of the waveform is deteriorated by the above mentioned clipping. In other words, if a video signal 1 as shown in FIG. 4A is pre-emphasized at the recording side of the VTR and the overshoot portion 4 of the video signal 1 is sliced by a predetermined upper slice level 21 as shown in FIG. 4B, a waveform distortion 22a corresponding to the sliced signal component is produced in a reproduced video signal at the reproducing side as shown in FIG. 4C after the de-emphasis. Since the conventional level slice circuit 18 slices the video signal itself, if the slice level is increased, not only the waveform will be distorted but also the sliced information will be lost completely. It is well known that the improvements of the waveform characteristic and of the inversion phenomenon are contrary to each other. So, it was very difficult to improve the waveform characteristic and to prevent the inversion phenomenon at the same time.

On the other hand, in order to make the frequency characteristic of the video signal flat in the recording-/reproducing system of the known VTR, t is proposed to reduce a recording current (current of frequency modulated video signal) supplied to a magnetic head (rotary magnetic head) as the frequency: of the video signal is increased.

For this reason, if the frequency characteristic is applied to the recording current instead of providing the level slice circuit, the attention of the high frequency component of the FM-modulated video signal is decreased, so that the occurrence of the above inversion phenomenon can be avoided however, the frequency characteristic of the video signal can not be made flat in the recording/reproducing system of the VTR.

By the way, since the high frequency component near the frequency of about 1 MHz or above tends to be attenuated in electromagnetic conversion characteristic, if the recording current to be supplied to the magnetic head (rotary magnetic head) is reduced as the frequency becomes high, the attenuation of each of the frequency components is emphasized.

OBJECTS AND SUMMARY OF THE INVENTION

Accordingly, it is an object of this invention to provide an improved apparatus for processing a video signal to be recorded.

Another object of this invention is to provide an apparatus for processing a video signal to be recorded which can prevent the frequency characteristic and waveform characteristic of a video signal from being deteriorated as much as possible.

A further object of this invention is to provide an apparatus for processing a video signal to be recorded which can prevent a so-called inversion phenomenon of white and dark levels.

A yet further object of this invention is to provide an apparatus for processing a video signal to be recorded, which is suitable for use with a recording and/or reproducing apparatus such as a video tape recorder (VTR) and so on.

According to one aspect of the present invention, there is provided an apparatus for processing a video signal to be recorded comprising:
(a) pre-emphasis means for pre-emphasizing a signal component with a first predetermined frequency band in the video signal to produce a pre-emphasized video signal;
(b) modulating means for frequency modulating a carrier with the pre-emphasized video signal to be recorded;
(c) extracting means for extracting a signal component with a second frequency band within the first predetermined frequency band and having a level higher than a threshold level from the video signal;
(d) multiplier means for multiplying the outputs of the modulating means and the extracting means whereby the amplitude of the frequency modulated signal, from the modulating means at the portion when the extracted signal is obtained is higher than that at the rest of the portion; and
(e) recording amplifying means for amplifying the output of the modulating means.

These and other objects, features and advantages of the present invention will become apparent from the detailed description of the preferred embodiments that are to be read in conjunction with the accompanying drawings, in which like reference numerals identify like elements and parts.

BRIEF DESCRIPTION OF THE DRAWINGS

FIG. 3 is a block diagram showing an example of a known video signal recording apparatus;

FIGS. 4A to 4C are respectively waveform charts used to explain the defects encountered with the known apparatus of FIG. 3;

DESCRIPTION OF THE PREFERRED EMBODIMENTS

Now, the present invention will hereinafter be described in detail with reference to the attached drawings.

Figure 1A:
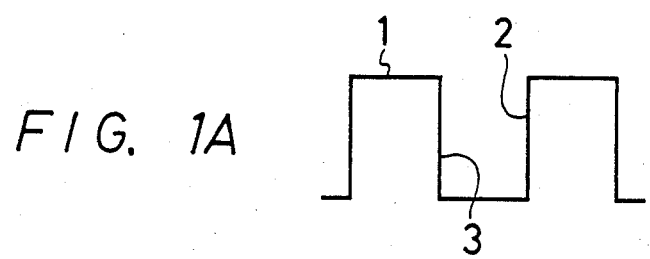
FIGS. 1A and 1B are respectively waveform charts used to explain a pre-emphasized video signal.
Figure 1B:
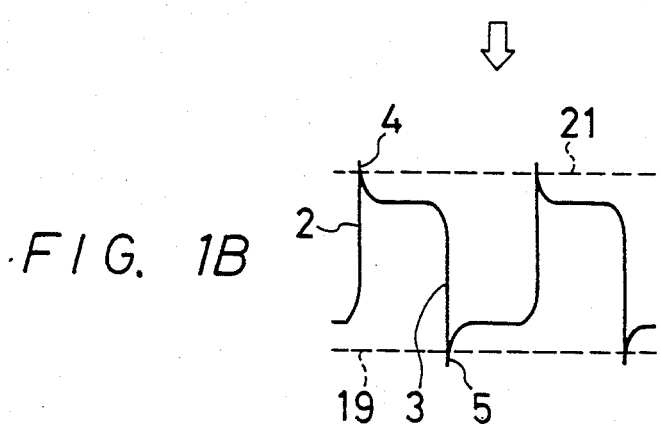
Figure 2A:
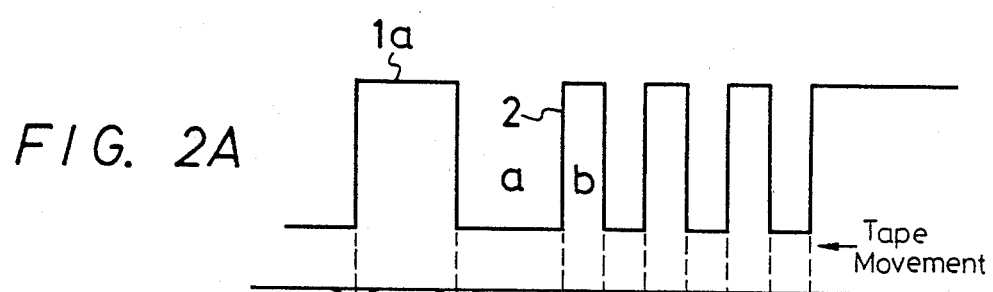
FIGS. 2A to 2C are respectively waveform charts used to explain why so-called inversion phenomenon will occur.
Figure 2B:
Figure 2C:
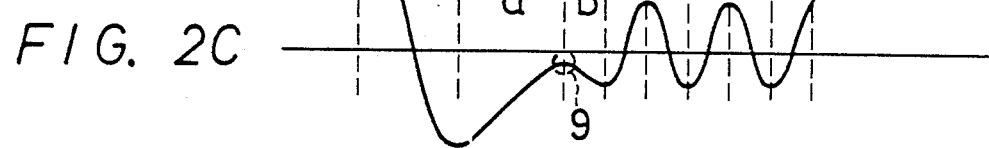
Figure 5:
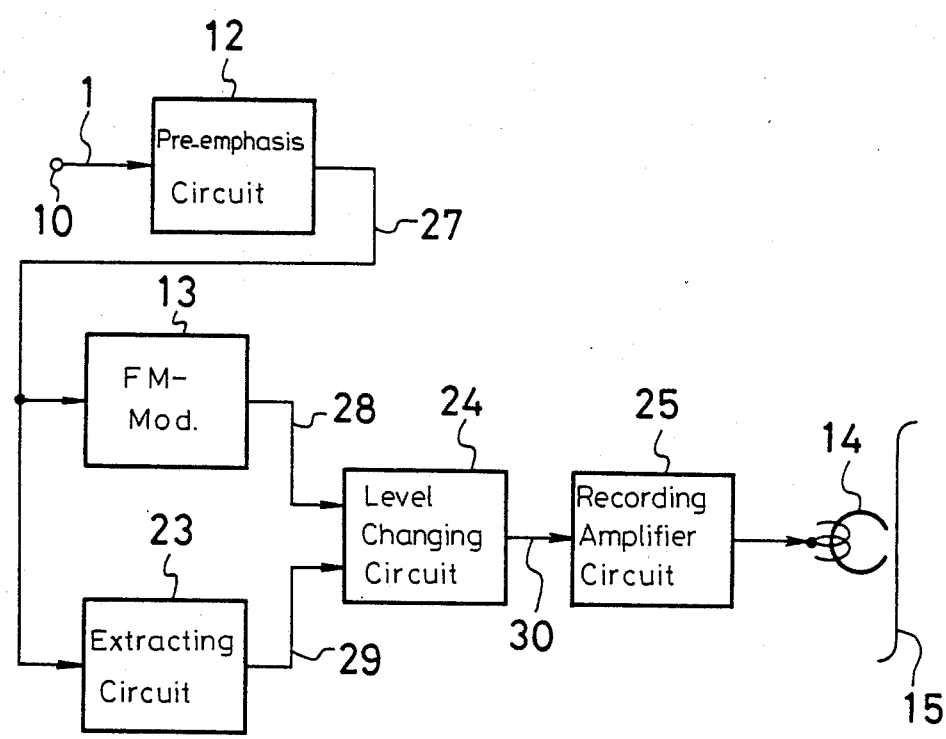
FIG. 5 is a block diagram of an embodiment of an apparatus for processing a video signal to be recorded according to the present invention.

FIG. 5 illustrates a first embodiment of an apparatus for processing a video signal to be recorded according to the present invention.

Referring to FIG. 5, a signal input terminal 10 is connected to the input side of a pre-emphasis circuit 12 of which the output side is connected to the input side of a frequency modulating circuit 13. The output side of the pre-emphasis circuit 12 is also connected to the input side of an extracting circuit (level slice circuit) 23. The output sides of the frequency modulating circuit 13 and the extracting circuit 23 are both connected to the input side of a level changing circuit (balanced modulator) 24. The output side of the level changing circuit 24 is connected to the input side of a recording amplifying circuit 25. The output side of the recording amplifying circuit 25 is connected to a magnetic head (rotary magnetic head) 14. The magnetic head (a damping resistor is connected in parallel to the winding thereof) 14 is in contact with a magnetic tape 15.

The operation of the thus constructed apparatus of the invention will be described with reference to FIGS. 6A to 6E forming waveform charts.

Figure 6:
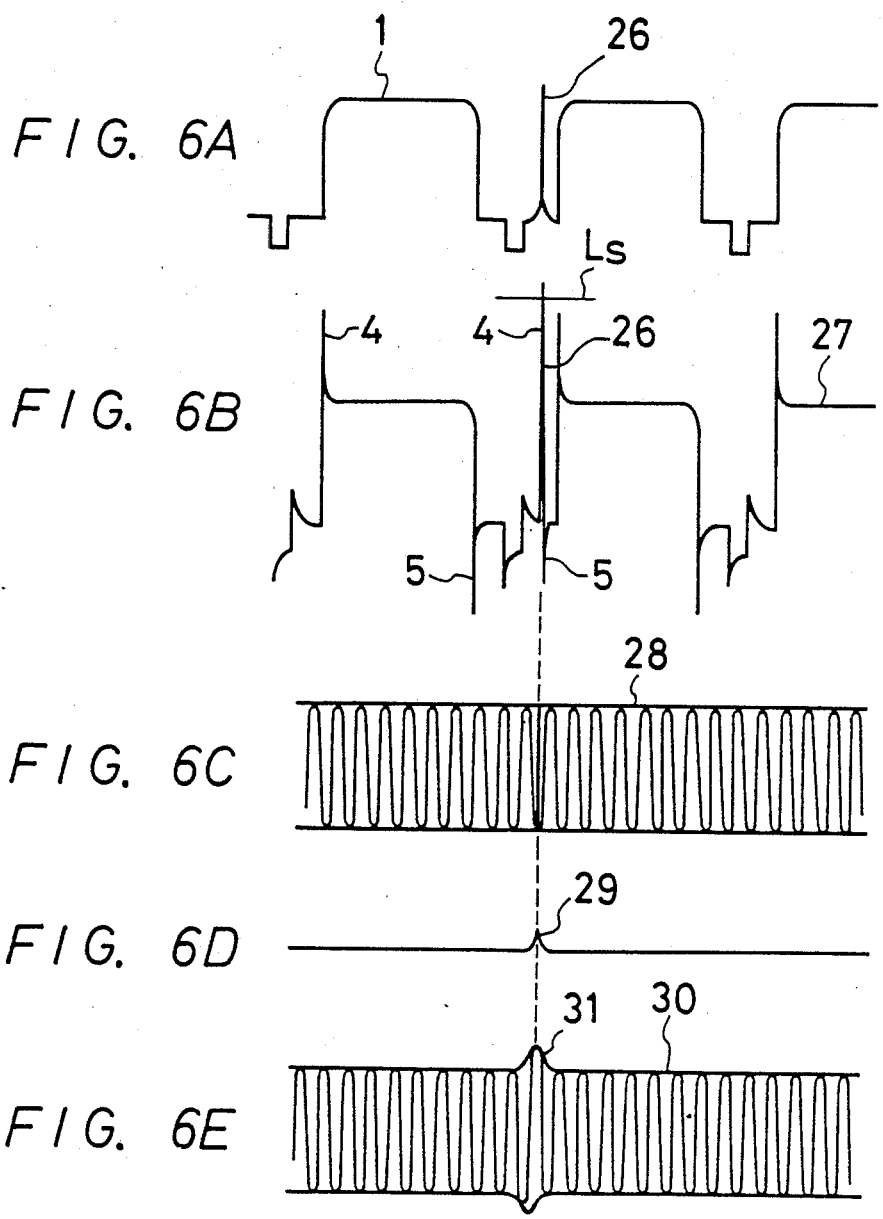
FIGS. 6A to 6E are respectively waveform charts used to explain the operation of the apparatus shown in FIG. 5.

In the illustrative example of FIG. 5, a luminance signal (video signal) 1, which is separated from a composite color video signal as shown in FIG. 6A, is applied to the signal input terminal 10. In this case, let it be assumed that this video signal 1 contains a large amplitude component 26 which will cause a so-called inversion phenomenon.

The video signal 1 applied to the input terminal 10 is supplied to the pre-emphasis circuit 12, in which it is pre-emphasized such that it is differentiated at its leadig and trailing edge portions to thereby produce the overshoot and undershoot portions 4 and 5 respectively as shown in FIG. 6B. The overshoot portion 4 and the undershoot portion 5 are also generated at the large amplitude component 26 of the video signal 1.

A video signal 27, which is pre-emphasized by the pre-emphasis circuit 12 such that its high frequency component is emphasized as shown in FIG. 6B, is supplied to the frequency modulating circuit 13, in which it is frequency-modulated as usual so that a frequency modulated video signal 28 shown in FIG. 6C is derived from the frequency modulating circuit 13.

The pre-emphasized video signal 27 from the pre-emphasis circuit 12 is also supplied to the extracting circuit (level slice circuit) 23, by which a signal component with the level higher than a predetermined level $L_S$ as shown in FIG. 6B is extracted from the pre-emphasized video signal as an extracted signal 29 as illustrated in FIG. 6D. Then, the frequency modulated video signal 28 and the extracted signal 29 are both fed to the level changing circuit (balanced modulator in this embodiment) 24, in which they are modulated such that the level of the frequency modulated video signal 28 is changed in response to the extracted signal 29 as shown in FIG. 6E, or the frequency modulated video signal 28 is amplitude-modulated by the extracted signal 29.

Consequently, the level changing circuit 24 generates a frequency modulated video signal 30 with an amplitude 31 corresponding to the level of the extracted signal 29. The frequency modulated signal 30 with the amplitude 31 is supplied to the recording amplifying circuit (voltage-to-current converter) 25. Then, this recording amplifying circuit 25 supplies a recording current (frequency-modulated signal current) to the magnetic head 14 of which the winding is connected in parallel to the damping resistor, whereby a current is made small as the frequency becomes high and the frequency characteristic of the video signal is made flat. Thus, the video signal is recorded on the magnetic tape 15. The above mentioned extracting circuit 23 and the level changing circuit 25 are not limited to the balanced modulating circuit but may be, for example, a variable gain amplifying circuit or the like which can increase or decrease the amplitude of the signal in response to the level of the level slice circuit 23.

Figure 7:
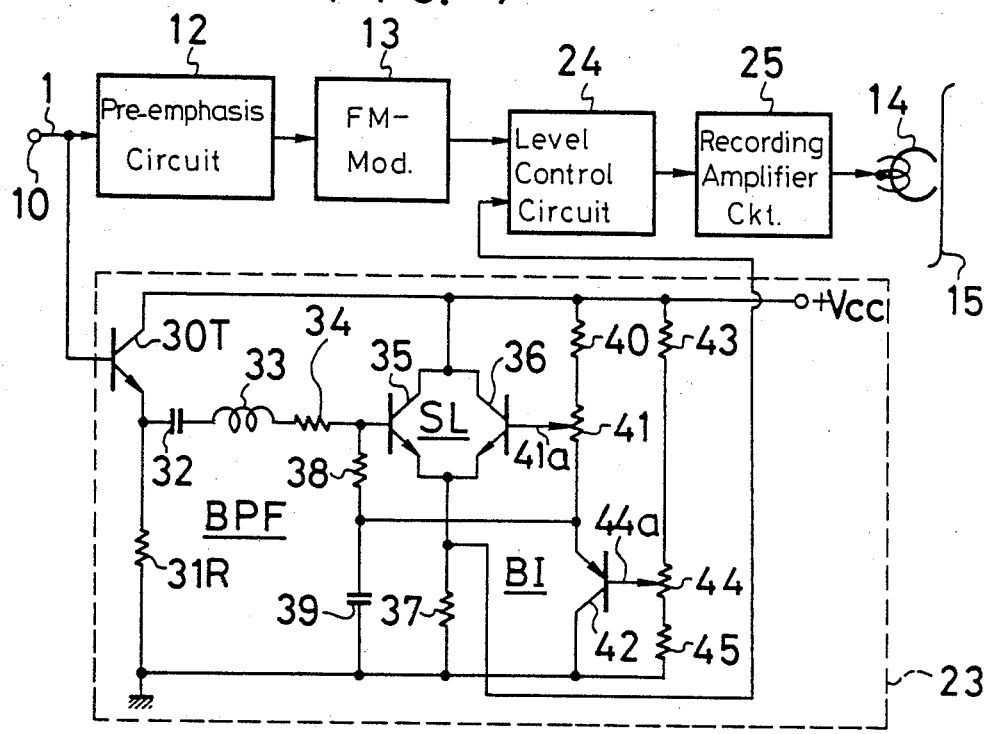
FIG. 7 is a block diagram of another embodiment of the apparatus for processing a video signal to be recorded according to the present invention.

In the embodiment illustrated in FIG. 5, the extracting circuit (or level slice circuit) 23 is connected to the output side of the pre-emphasis circuit 12. Alternatively, this extracting circuit 23 may be connected to the input side of the pre-emphasis circuit 12. This modified embodiment of the invention will be described with reference to FIG. 7. In FIG. 7, like parts corresponding to those of FIG. 5 are marked with the same references and therefore need not be described in detail.

In the embodiment illustrated in FIG. 7, the video signal 1 applied to the input terminal 10 is supplied to the pre-emphasis circuit 12 and to the extracting circuit 23. The extracting circuit 23 in FIG. 7 is analogus to that appeared in FIG. 5. In the case of FIG. 5, the extracting circuit 23 is connected to the output side of the pre-emphasis circuit 12 and is supplied with the video signal 1 of which the high frequency component was already pre-emphasized, so that the extracting circuit 23 is required only to extract the signal component with high level. While, in the case of FIG. 7, since the video signal 1 at the input side of the pre-emphasis circuit 12 is supplied to the extracting circuit 23, a bandpass filter must be provided at the preceding stage of the level extracting. The inside circuit arrangement of the extracting circuit 23 will be described in greater detail hereinbelow with reference to FIG. 7.

Referring to FIG. 7, the video signal 1 applied to the input terminal 10 is supplied to a base of an emitter-follower transistor 30T of which the emitter is grounded through a resistor 31R. The emitter of the transistor 30T is also connected through a bandpass filter BPF formed of a series circuit of a capacitor 32, a coil 33 and a resistor 34 to a base of atransistor 35. The bandpass filter BPF may be arranged to have a pass band characteristic correlated to the frequency characteristic of the pre-emphasis circuit 12 to some extent. By way of example, the center frequency of the bandpass filter BPF is 4.5 MHz and the pass band thereof is relatively wide. The transistor 35 and a transistor 36 constitute a level slice circuit SL of non-additive mixer type. The base of the transistor 36 is connected to a sliding contact 41a of a variable resistor (or potentiometer) 41 by which the slice level of the video signal 1 is determined. The emitters of the transistors 35 and 36 are connected together and grounded through a resistor 37. An output terminal as the extracting circuit 23 is led out from the junction between the emitters of the transistors 35 and 36. The output signal developed at the output terminal is supplied to the level changing circuit 24. A transistor 42, resistors 43, 44, 45 and 38 and a capacitor 39 constitute a bias circuit BI for performing the temperature compensation of the above mentioned level slice circuit SL. The resistor 44 is a variable resistor (or potentiometer) of which the sliding contact 44a is connected to the base of the transistor 42.

The operation of this extracting circuit 23 will be described next. Of the signal components of the input video signal 1, a frequency component which will probably cause the above mentioned inversion phenomenon, for example, a frequency component near 4.5 MHz is extracted by the bandpass filter BPF and then fed to the level slice circuit SL. Of the signal components, the signal component with the level higher than the slice level supplied to the base of the transistor 36 is developed across the load resistor 37 as the output signal, and the level changing circuit 24 is controlled by this output signal. If the level of the output signal from the bandpass filter BPF is lower than the slice level, the transistor 35 is cut off, whereby a signal developed at the output terminal of the extracting circuit 23 becomes a constant voltage dependent on the slice level. Other operations are perfectly the same as those of the circuit arrangement shown in FIG. 5.

According to the circuit arrangement shown in FIG. 5, since the signal component with the level higher than the predetermined level is extracted from the output signal from the pre-emphasis circuit 12 by the extracting circuit 23, also the signal components in which the inversion phenomenon is difficult to occur are extracted by the extracting circuit 23 even though they have the level higher than the predetermined level. Then, the level of the frequency modulated signal is increased by the signal extracted. In accordance with the circuit arrangement shown in FIG. 7, signals near the signal with frequency component having a high possibility of causing the so-called inversion phenomenon are extracted and the signal component with level higher than the predetermined level of the extracted component is further extracted, whereby the efficiency can be enhanced more.

According to the above mentioned circuit arrangements shown in FIGS. 5 and 7, the inversion phenomenon can be avoided by recording the video signal in such a manner that the large amplitude portion 26 (FIG. 6B) of the video signal 1, or the amplitude of the high frequency portion of the frequency modulated video signal 28 (FIG. 6C) is made large and upon reproducing, the level of the frequency modulated video signal having the enlarged amplitude portion become high enough to be demodulated. In this case, if the amplitude of the video signal becomes too large, the amplitude of the frequency modulated video signal that is reproduced is decreased. The reason for this will be described next with reference to FIG. 8 forming a characteristic graph.

Figure 8:
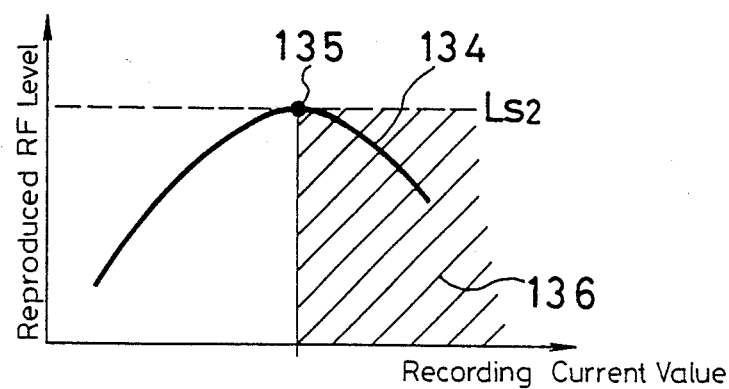
FIG. 8 is a characteristic graph of a recording current vs. a reproduced RF level.

In general, when the signal is supplied to the magnetic head 14 and then recorded on the magnetic tape 15, if, as shown in the graph of FIG. 8, the abscissa indicates the recording current value and the ordinate the level of the reproduced RF signal, a relationship curve 134 therebetween shows such a characteristic that has a point 135 which becomes the maximum reproduced RF level as the recording current value is increased and, even though the recording current value is increased beyond that point 135, the reproduced RF level decreases. This characteristic is what may be called self-demagnetizing action in the magnetic recording (hereinafter, this action area will be referred to as a self-demagnetizing area as shown by a hatched area 136 in FIG. 8). Although the point 135 at which the maximum reproduced RF level is presented is adjusted and selected upon recording of the signal, if the amplitude 31 of the frequency modulated video signal 30 (FIG. 6E) becomes too large, the adjusted point 135 will be displaced in the direction in which the reproduced RF level is reduced, or the direction of the self-demagnetizing area 136, so that a probability of reducing the amplitude of the frequency modulated video signal is decreased becomes large.

Figure 9:
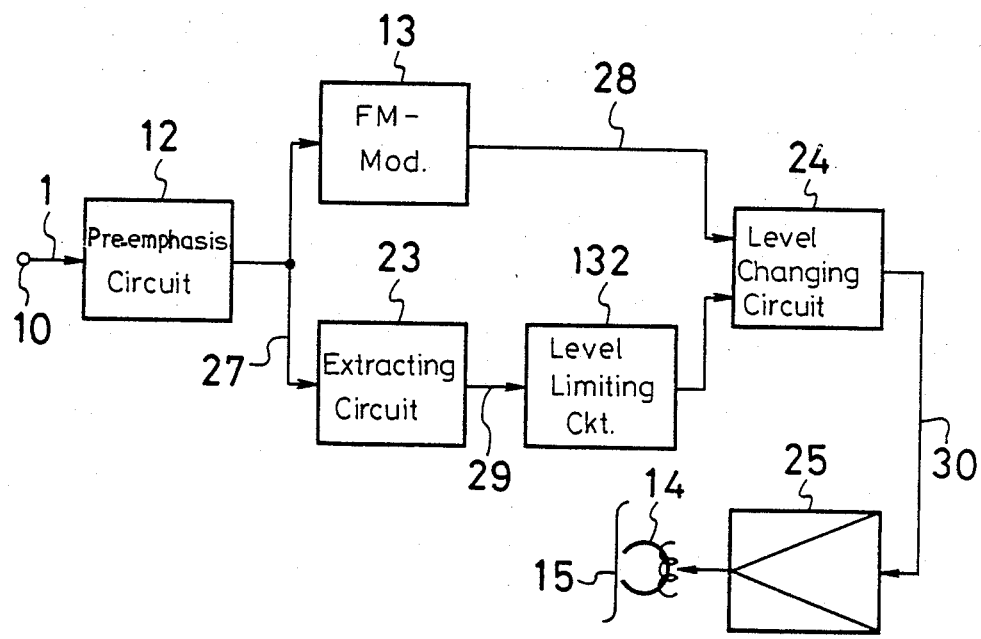
FIG. 9 is a block diagram showing a further embodiment of the apparatus for processing a vido signal to be recorded according to the present invention.

Accordingly, another embodiment of this invention which can overcome such shortcomings as described hereinabove will now be described with reference to FIG. 9 forming a block diagram. In FIG. 9, like parts corresponding to those of FIG. 5 are marked with the same reference numerals and will not be described in detail. The circuit arrangement of FIG. 9 is substantially the same as that of FIG. 5 and is different only in that the output terminal of the extracting circuit 23 is connected to an input terminal of a level limiting circuit (level limiter circuit) 132 and that the output terminal of this level limiting circuit 132 is connected to one input terminal of the level changing circuit 24.

The operation of the circuit arrangement in FIG. 9 will be described below.

The extracted signal 29 (FIG. 6D) is generated from the extracting circuit 23. If the level of this extracted signal 29 is limited at a second threshold level $L_{S2}$ which is the recording current value point 135 at which the recording current value does not fall within the self-demagnetizing area 136 and the reproduced RF level becomes the maximum, as already described in relation to the curve 134 in FIG. 8, the signal component of the extracted signal 29 of high level is sliced and an extracted signal of which the signal level is limited can be obtained. Then, the level of the frequency modulated video signal 28 (FIG. 6C) is changed in response to the output from the level-limited extracted signal as shown in FIG. 6E. In other words, the frequency modulated video signal 28 is amplitude-modulated relative to the extracted signal component which is level limited.

As a result, the level changing circuit 24 generates the frequency modulated video signal 30 (FIG. 6E) having the amplitude 31 corresponding to the level of the extracted signal 29 of which the level is limited as shown in FIG. 6D. The frequency modulated video signal 30 with this amplitude 31 is supplied to the recording amplifying circuit (voltage-to-current converter) 25 and the recording current (frequency modulated video signal) is supplied to the magnetic head 14.

Alternatively, in the illustrated embodiment shown in FIG. 9, it is possible that the connection relationship between the level limiting circuit 132 and the extracting circuit 23 is exchanged to obtain the extracted signal from the extracting circuit 23 after the level limiting circuit 132 produced the level-limited signal. Further, the extracting circuit 23 and the level limiting circuit 132 may be combined together.

According to the circuit arrangement of this embodiment shown in FIG. 9, even if the recording current value in the magnetic recording is increased, the reproduced RF signal is prevented from being decreased. As a result, the so-called self-demagnetization can be avoided, the inversion phenomenon can be decreased and the video signal can be prevented from being deteriorated.

Figure 10:
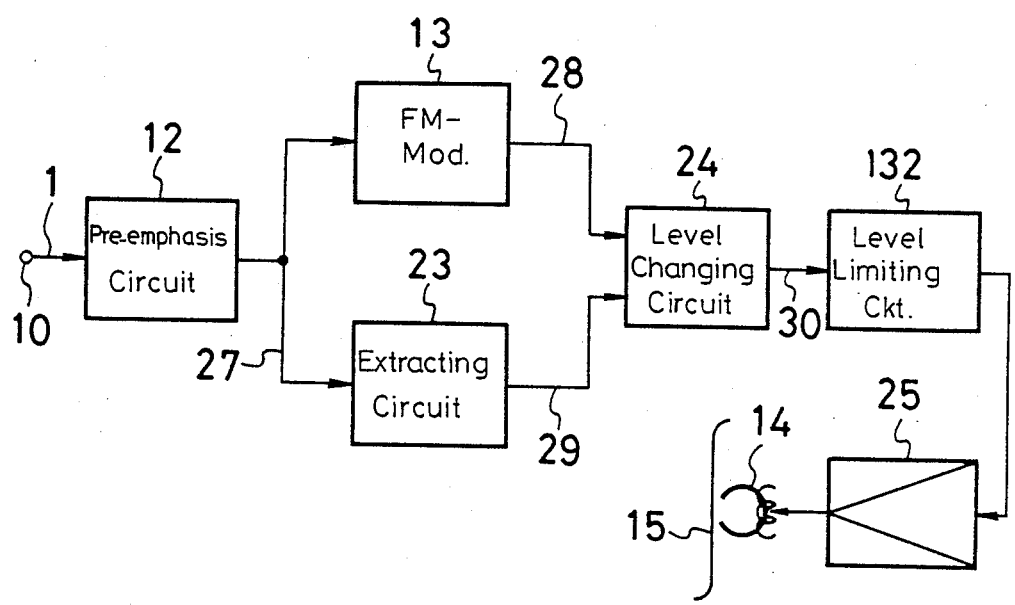
FIG. 10 is a block diagram showing a still further embodiment of the apparatus for processing a video signal to be recorded according to the present invention.

FIG. 10 is a block diagram showing a further embodiment of the present invention. In this embodiment, as shown in FIG. 10, the level limiting circuit 132 is connected to the rear stage of the level changing circuit 24.

In this case, the amplitude 31 of the frequency modulated video signal 30 shown in FIG. 6E is limited at the second threshold level $L_{S2}$ (FIG. 8).

According to the video signal processing apparatus of the present invention, as set forth above, the frequency characteristic and waveform characteristic of the video signal can be prevented from being deteriorated as much as possible by increasing the amplitude of the frequency modulated video signal at the portion in which the inversion phenomenon will easily occur, hence the high frequency component attenuated by reproducing the frequency modulated video signal of the input video signal having the large amplitude is hidden by the pre-emphasized low frequency component and the phase of this frequency signal is difficult to be detected, to thereby avoid the inversion phenomenon.

Furthermore, according to the video signal processing apparatus of the present invention, it becomes possible to obtain an inversion phenomenon preventing circuit which can suppress the deterioration of the frequency characteristic and the waveform characteristic of the video signal to the minimum while which can prevent the inversion phenomenon from being produced.

The above description is given on the preferred embodiments of the invention but it will be apparent that many modifications and variations could be effected by one skilled in the art without departing from the spirit or scope of the novel concepts of the invention, so that the scope of the invention should be determined by the appended claims only.

We claim as our invention:

1. Apparatus for processing a video signal to be recorded, comprising:
   (a) pre-emphasis means for pre-emphasizing a signal component with a first predetermined frequency band in said video signal and producing a pre-emphasized video signal therefrom;
   (b) modulating means for frequency modulating a carrier signal with the pre-emphasized video signal and producing an output therefrom;
   (c) extracting means for producing an output by extracting from the video signal a signal component with a second frequency band within said first predetermined frequency band that has a level higher than a predetermined threshold level;
   (d) multiplier means for multiplying the outputs of said modulating means and said extracting means whereby the output signal produced has the amplitude of the frequency modulated output signal from said modulating means increased at a location when said extracted signal is obtained; and
   (e) recording amplifying means for amplifying the output signal produced by said multiplier means.

2. Apparatus according to claim 1, wherein said extracting means is connected to receive said pre-emphasized video signal from said pre-emphasis means and includes a level slice circuit for separating any signal component having a level higher than said threshold level from said pre-emphasized video signal.

3. Apparatus according to claim 1, wherein said extracting means is connected to receive the video signal input to said pre-emphasis means and includes bandpass filter means for passing the signal component with said second frequency band and a level slice circuit for separating any signal component with the level higher than said threshold level.

4. Apparatus according to claim 3, wherein said level slice circuit includes a non-additive mixer having a pair of transistors, a base of the first transistor being connected to the output of said bandpass filter means and a base of the second transistor being connected to a voltage source having the threshold level.

5. Apparatus according to claim 1, wherein said multiplier means includes a balanced modulating circuit having a pair of input terminals to which the outputs of said modulating means and said extracting means are supplied, respectively.

6. Apparatus according to claim 1, wherein said extracting means includes a level limiter for limiting the level of said extracted signal to a second threshold level.

7. Apparatus according to claim 6, wherein said second threshold level corresponds to a recording current level at which a maximum RF level is obtained.

8. Apparatus according to claim 1, wherein said multiplier means includes a level limiter for limiting the level of said multiplied output to a second threshold level.

9. Apparatus according to claim 8, wherein said second threshold level corresponds to a recording current at which a maximum RF level is obtained.

10. Apparatus for processing a video signal to be recorded, comprising;
   pre-emphasizing means for pre-emphasizing signal components of the video signal within a first frequency band and producing a pre-emphasized video signal;
   means for modulating a carrier signal with said pre-emphasized video signal and producing a modulated video signal;
   means for determining locations of signal components in the pre-emphasized video signal that are in a second frequency band within said first frequency band and that exceed a predetermined level threshold and producing an output signal indicating the locations and extent of such signal components exceeding the threshold; and
   means receiving the modulated video signal and being responsive to said output from said means for determining for producing a modulated output signal having increased signal levels at the determined locations exceeding said threshold.

* * * * *